United States Patent [19]

Baker et al.

[11] Patent Number: 4,702,578
[45] Date of Patent: Oct. 27, 1987

[54] ALIGNMENT METHOD AND CARTRIDGE APPARATUS FOR APPARATUS FOR GENERATING COLOR TEXT AND GRAPHICS ON PHOTOGRAPHIC MEDIA

[75] Inventors: Philip G. Baker, Cupertino; James Yurchenco, Palo Alto, both of Calif.

[73] Assignee: Presentation Technologies, Inc., Santa Clara, Calif.

[21] Appl. No.: 912,845

[22] Filed: Sep. 25, 1986

[51] Int. Cl.$^4$ .............................................. G03B 15/24
[52] U.S. Cl. ......................................................... 354/15
[58] Field of Search .................................... 354/12–15; 355/40

[56] References Cited

U.S. PATENT DOCUMENTS

| | | | |
|---|---|---|---|
| 3,590,705 | 7/1971 | Moyroud | 354/13 X |
| 3,688,672 | 9/1972 | Hanson et al. | 354/13 X |
| 4,335,941 | 6/1982 | Moyroud et al. | 354/15 |

*Primary Examiner*—Donald A. Griffin
*Attorney, Agent, or Firm*—Lyon & Lyon

[57] ABSTRACT

The present invention provides an alignment method and cartridge apparatus for an apparatus for generating color text and graphics on photographic media. The cartridge has flanges which project therefrom and which interact with projections on the apparatus to guide the cartridge into secure and consistent alignment. A driving means and locking means for maintaining the driving means in the disengaged position upon withdrawal of the cartridge is also provided. The driving means is preferably a motor connected to a pivoting bracket which has an engagement pin extending therefrom. Biasing means act to urge the driving means into the engaged position. The locking means is preferably a pivoting locking bar having a notch at one end which interacts with the engagement pin extending from the driving means bracket. An actuation pin extends from the pivoting locking bar and bias means act to urge the pivoting locking bar into engagement with the driving means. The cartridge has a first and second shoulder formed thereon and a guide groove formed therein. Upon insertion of the cartridge, the second shoulder engages with the engagement pin of the driving means thereby releasing it from the locking bar. The guide groove simultaneously engages the actuation pin of the locking bar. As the cartridge is further inserted into the apparatus, the guide groove acts to pivot the locking bar away while the shoulder acts to guide the driving means into driving engagement with the rotatable font wheel. Bearing shafts are provided to support the rotatable font wheel against the force of the driving means. Upon withdrawal of the cartridge, the locking bar pivots into engagement with the driving means which is moved into the disengaged position through interaction between the engagement pin and the second shoulder.

2 Claims, 13 Drawing Figures

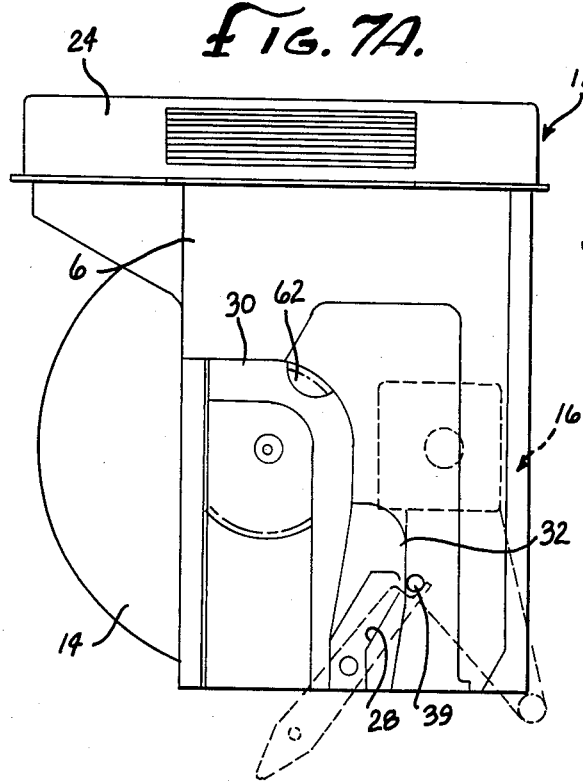
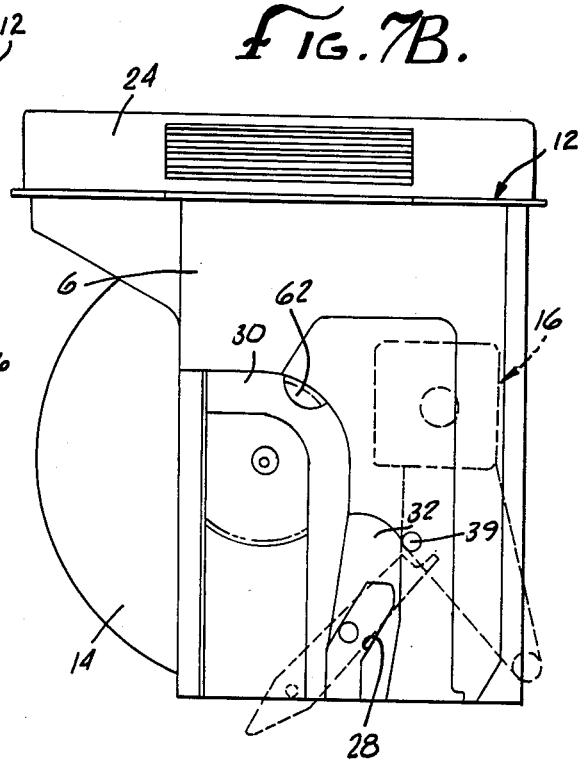
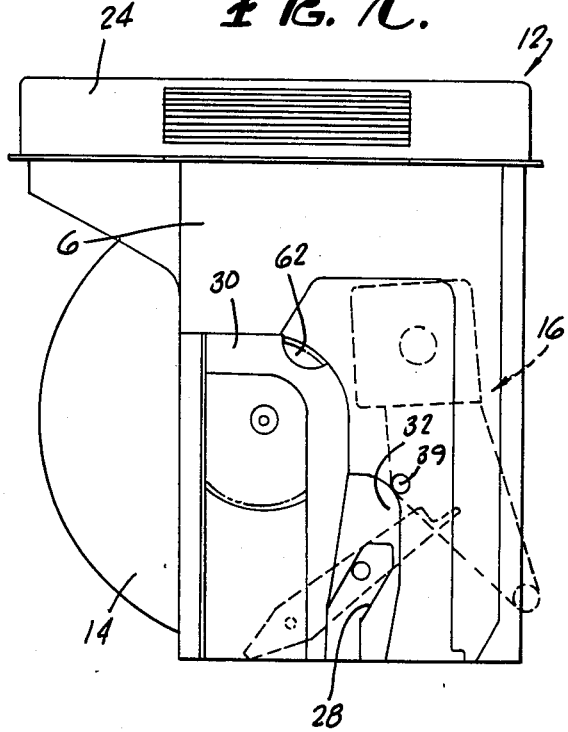
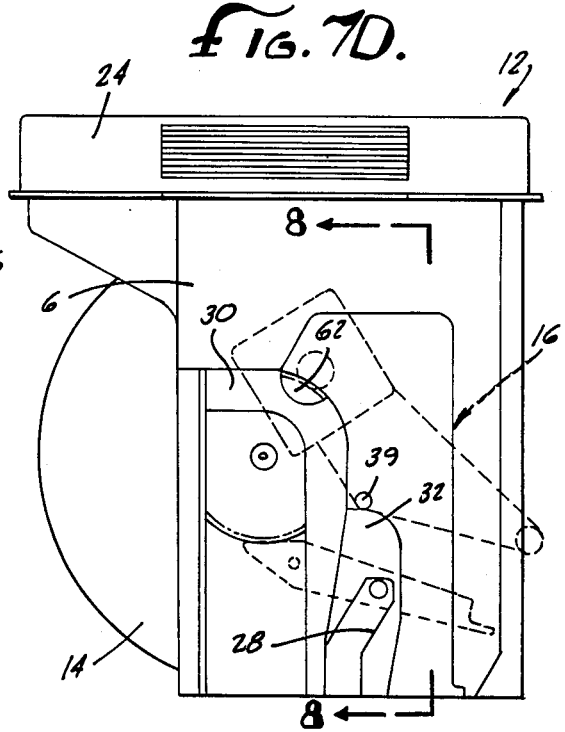

ALIGNMENT METHOD AND CARTRIDGE APPARATUS FOR APPARATUS FOR GENERATING COLOR TEXT AND GRAPHICS ON PHOTOGRAPHIC MEDIA

BACKGROUND

The present application is related to Baker et al., U.S. patent application Ser. No. 785,466, filed on Oct. 8, 1985, the disclosure of which is hereby referred to and incorporated herein in full by reference.

As will be understood to those skilled in the art, the apparatus associated with the present invention is best utilized for generating color text and graphics on photographic media. The apparatus is provided with a rotatable font wheel. In order to meet the needs of users of such devices, it is desirable to provide a means by which such rotatable font wheel may be securely inserted into and conveniently removed from such apparatus.

SUMMARY OF THE INVENTION

It is an object of the present invention to provide a means for securely positioning a font wheel in an apparatus for generating color text and graphics on photographic media.

It is a further object of the present invention to provide a means by which a securely positioned font wheel may be conveniently removed from an apparatus for generating color text and graphics on photographic media. Other and more detailed objects of the present invention will become apparent from an examination of the present disclosure.

BRIEF DESCRIPTION OF THE DRAWINGS

The present invention shall be described hereinafter in more detail with respect to the drawings, wherein:

FIGS. 7A-7D is a view of the present invention including various components positioned within the apparatus for generating color text and graphics on photographic media shown in various positions during insertion or withdrawal of the present invention;

DETAILED DESCRIPTION OF THE PREFERRED EMBODIMENT

Figure 1:
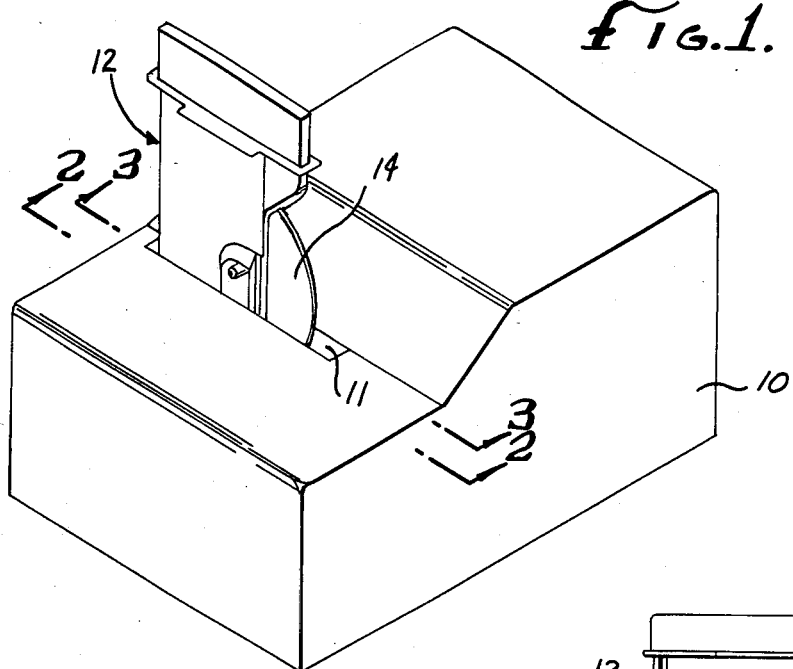
FIG. 1 is a perspective view of the present invention shown partially engaged with an apparatus for generating color text and graphics on photographic media.
Figure 2:
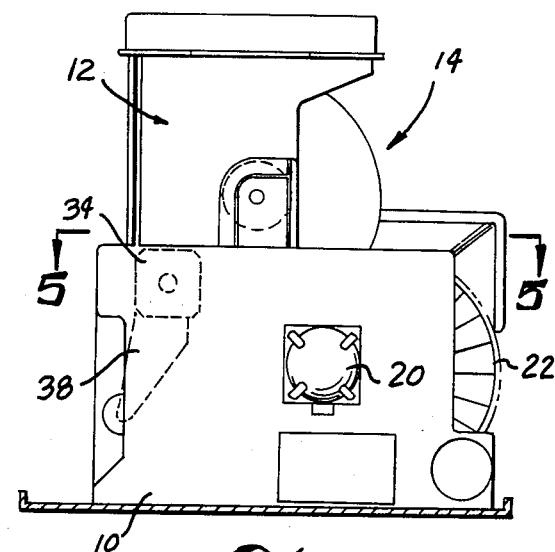
FIG. 2 is a cross-sectional view taken substantially along line 2—2 of FIG. 1.

As illustrated most clearly in FIG. 1, the present invention may be as conveniently inserted or withdrawn from a cavity 11 in an apparatus for generating color text or graphics on a photographic media 10. Referring to the figures, the present invention includes a cartridge 12 which is arranged to rotatably support a font wheel 14. The cartridge means 12 is arranged to be positioned within the apparatus 10 such that the exposed portion of the font wheel 14 will be substantially opposed to the light means 20 and adjacent to the rotating color wheel means 22 of the apparatus. The present invention also includes a driving means 16 and a locking means 18.

In the preferred embodiment of the present invention, the cartridge means 12 includes a handle portion 24 and a body portion 26. As illustrated most clearly in FIGS. 7A-7D, the body portion 26 of the cartridge means includes a first shoulder means 30 and a second shoulder 32 formed on one side thereof. In addition, an actuation groove 28 is formed in the second shoulder 32. Moreover, alignment flanges 27 extend from a first side of the cartridge body portion 26. As will be described hereinafter, the first and second shoulders, 30 and 32, respectively, the actuation groove 28 and the alignment flanges 27 interact with other portions of the present invention so as to permit the cartridge 12 to be securely positioned and conveniently removed from the cavity 11 of the apparatus 10.

The driving means 16 preferably includes an electric motor means 34 having a driving sprocket 36 mounted thereon. The motor means 34 is preferably mounted to a pivoting mounting bracket 38. Biasing means, such as a tension spring 40 is positioned between the apparatus body 10 and the pivoting mounting bracket 38 of the driving means 16 so as to bias the driving means 16 into the engaged position.

Figure 9:
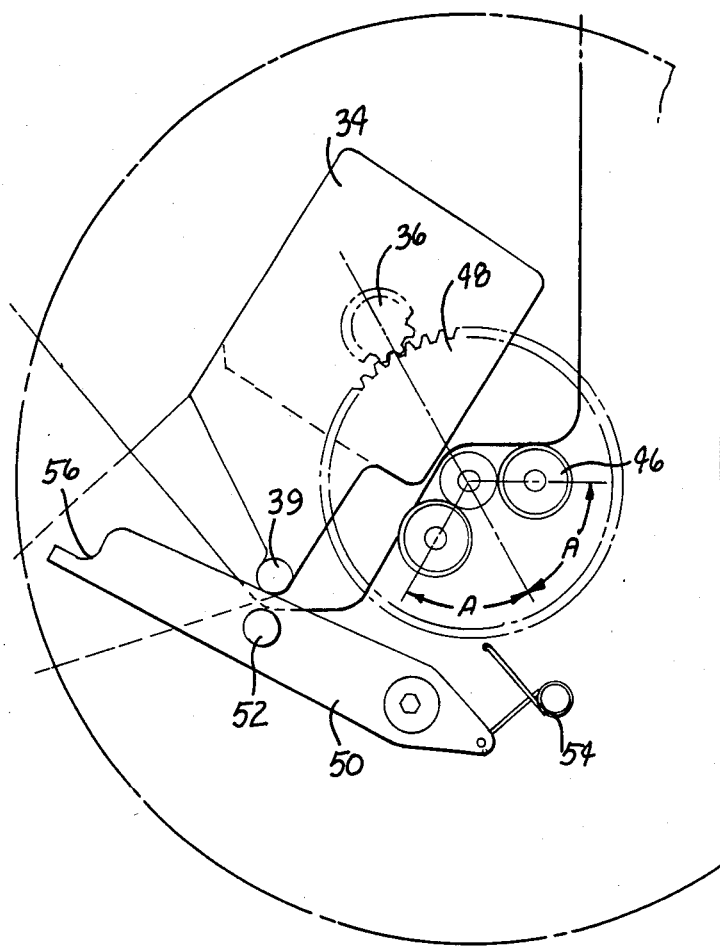
FIG. 9 is a sectional view taken substantially along line 9—9 of FIG. 8.
Figure 8:
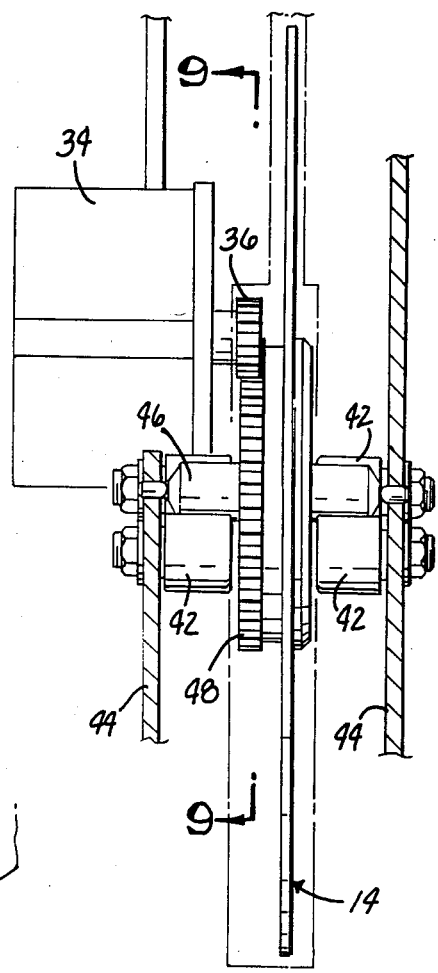
FIG. 8 is a sectional view taken substantially along line 8—8 of FIG. 7D showing engagement of the driving means with the font wheel when the present invention is fully positioned within the apparatus.
Figure 10:
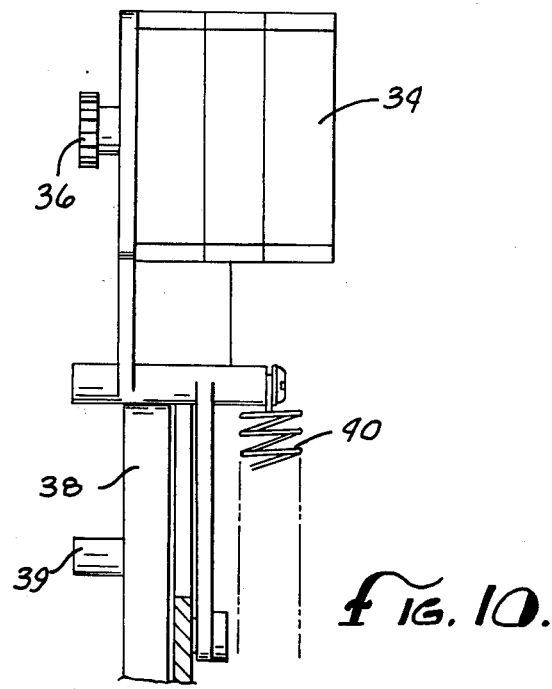
FIG. 10 is a sectional view taken substantially along line 10—10 of FIG. 6.

As will be understood to those skilled in the art, it is extremely important that the cartridge means 12 containing the font wheel 14 be securely and reliably positioned within the apparatus 10. In order to accomplish consistent and reliable positioning of the present invention within the apparatus 10, a plurality of support rollers 42 are connected to the apparatus cavity wall 44 so as to support the bearing shafts of the font wheel 14 when the cartridge means 12 is fully inserted into the apparatus 10. As illustrated most clearly in FIG. 9, the bearing shafts 46 are positioned at an equal angle "A" from the center line extending between the center of the driving sprocket 36 and the center of the font wheel sprocket 48 so as to equally distribute the load.

When the cartridge means 12 of the present invention is not engaged with the apparatus 10, the pivoting mounting bracket 38 which supports the motor means 34 is maintained in its disengaged position by a pivoting locking lever 50. The pivoting locking lever 50 includes an actuation pin 52 and is biased through biasing means such as a torsion spring 54 towards engagement with the engagement pin 39 on the pivoting mounting bracket 38. An engagement notch 56 is provided in the end of pivoting locking lever 50 to support the pivoting mounting bracket 38 and motor 34 against the influence of gravity and the tension spring biasing means 40.

In order to assist the smooth insertion or withdrawal of cartridge means 12 from the apparatus 10, at least one guide roller 58 is provided between the apparatus cavity walls 44 near the edge of the apparatus 10. Having fully described the structure of the present invention, its operation shall hereinafter be described.

Figure 3:
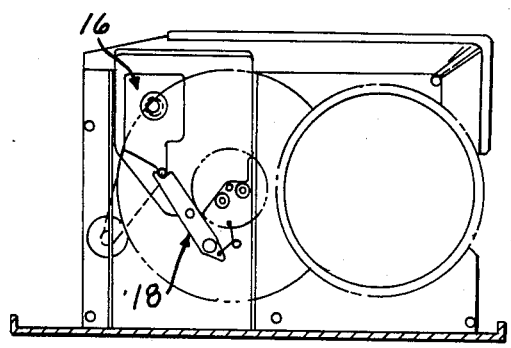
FIG. 3 is a cross-sectional view taken substantially along line 3—3 of FIG. 1.
Figure 4:
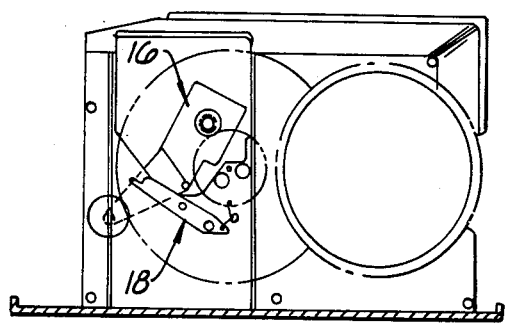
FIG. 4 is a view taken substantially along line 3—3 of FIG. 1 showing the position of certain components when the present invention is inserted into the apparatus for generating color text and graphics on photographic media.
Figure 5:
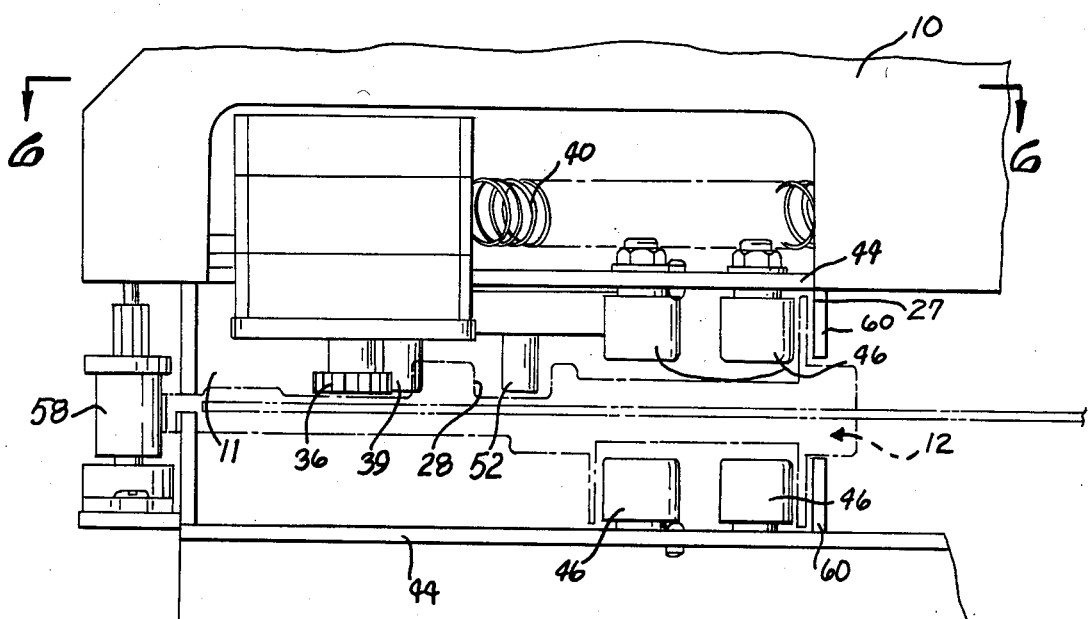
FIG. 5 is a top view taken substantially along line 5—5 of FIG. 2.
Figure 6:
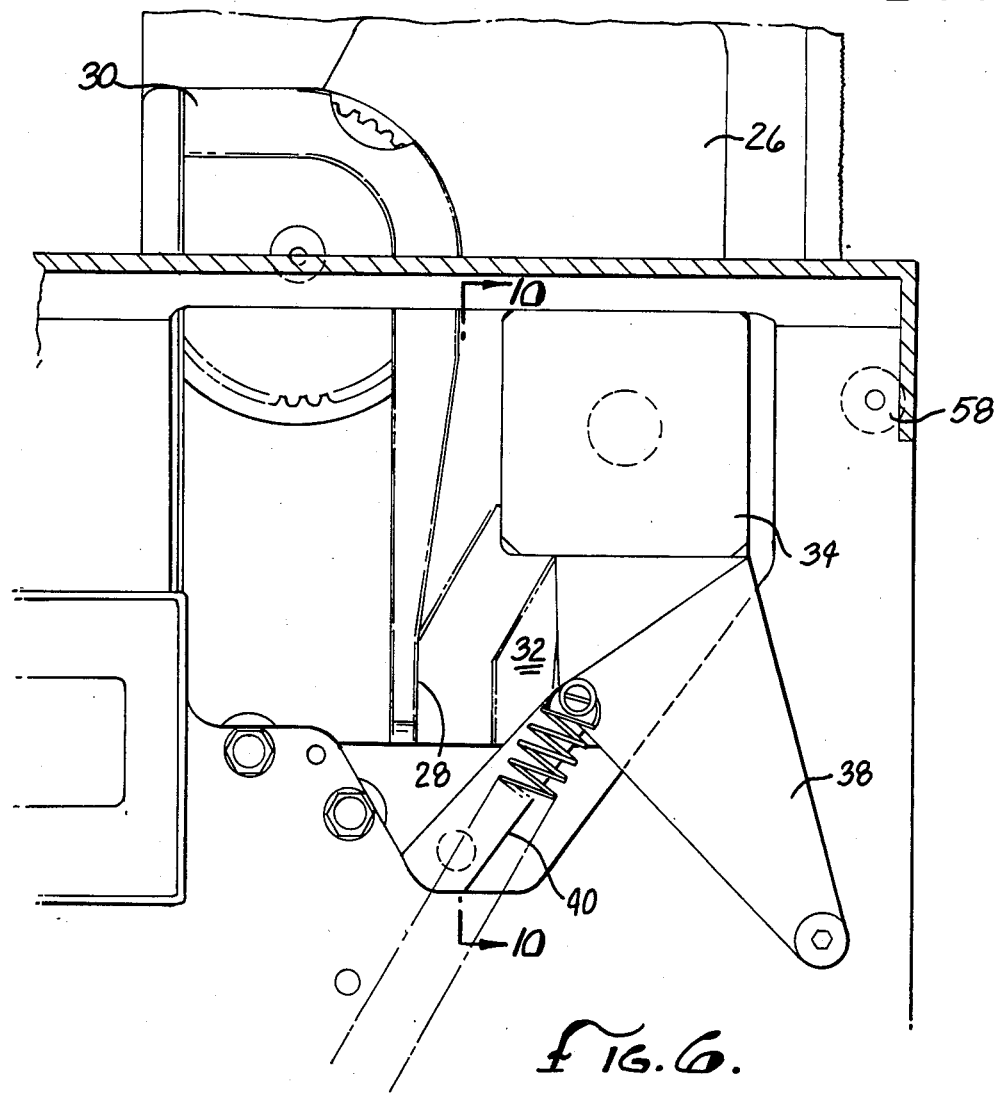
FIG. 6 is a sectional view taken substantially along line 6—6 of FIG. 5.

Prior to inserting the cartridge means 12 into the cavity of the apparatus 10, the pivoting mounting bracket 38 and motor 34 of the driving means 16 is supported in the disengaged position against the force of the tension spring biasing means 40 by the engagement of the notch 56 in the end of the pivoting locking lever 50 and the engagement pin 39. When it is desired to insert the cartridge means 12 containing a font wheel 14 into the cavity of the apparatus 10, the cartridge means 12 is positioned within the apparatus cavity 11 such that the alignment flanges 27 interact with the cavity side of the cavity projection 60 extending from the cavity walls 44. The other end of the cartridge means 12 interacts with the guide roller 58 so as to permit the cartridge 12 to be smoothly inserted into the apparatus cavity 11. The positions of the various components disclosed herein prior to initiating insertion of the cartridge 12 into the apparatus 10 are illustrated in FIG. 3.

Referring to FIGS. 3 and 7A–7D, as the cartridge 12 is preferably downwardly inserted into the cavity 11, the engagement pin 39 extending from the pivoting mounting bracket 38 interacts with the second shoulder 32 of the cartridge so as to disengage the engagement pin 39 from the notch 56 in the end of the pivoting locking lever 50. Simultaneously, the actuation pin 52 extending from the pivoting locking lever 50 enters the groove 28 formed in the body portion 26 of the cartridge. Upon continued downward insertion of the cartridge 12 into the apparatus 10, the notch 28 interacts with the actuation pin 52 so as to pivot the pivoting locking lever 50 against the force of its torsion spring biasing member 54 away from the engagement position with the pivoting mounting bracket 38. As illustrated in FIGS. 7C and 7D, continued downward insertion of the cartridge 12 into the apparatus cavity 11 results in engagement between the motor driving sprocket 36 and the font wheel driven sprocket 48 through a notch 62 in the cartridge lower portion first shoulder 30. The pivoting mounting bracket 38 pivots as illustrated in FIGS. 7A–7D under the influence of the tension spring biasing means 40.

Upon complete insertion of the cartridge means 12 into the apparatus cavity 11, the font wheel bearing shaft 46 interacts with the support rollers 42 so as to permit the motor 34 to smoothly drive the font wheel 14. So inserted, the cartridge is securely positioned within the apparatus cavity 11 such that reliable alignment may be insured due to the weight of the driving means 16 and the action of the tension spring biasing means which also inhibits accidental withdrawal of the cartridge. The interaction of the cartridge flanges with the cavity projections and walls acts to securely position the cartridge within the cavity during insertion, while inserted, and during withdrawal of the cartridge.

In addition, when the cartridge is fully inserted into the cavity 11, the flange which surrounds the handle portion of the cartridge acts as a light shield by covering the edges of the cavity. This light shield enhances the quality of the text or graphics generated on the photographic media as will be understood by those skilled in the art.

When it is desired to withdraw the cartridge from the apparatus cavity 11, an upward force on the cartridge means 12 transmits a disengagement force to the pivoting mounting bracket 38 through the interaction between the engagement pin 39 and the second shoulder 32 on the cartridge body portion 26. Similarly, the action of the torsion spring biasing means 54 on the pivoting locking lever 50 acts to pivot the locking lever 50 back up to engagement with the engagement pin 39 as the cartridge is continuously withdrawn from the apparatus cavity 11.

The foregoing description of the preferred embodiment of the present invention is for purposes of example only and should not be construed to limit the scope of the claims appended hereto.

We claim:

1. A cartridge for an apparatus for generating color text and graphics on photographic media including an insertion cavity having walls and projections, a pivoting driving means and a locking means to selectively maintain the driving means in the disengaged position, comprising, a cartridge body portion, said body portion including means to disengage the locking means from the pivoting driving means upon insertion of the cartridge into the cavity, said cavity including guide means arranged to guide the driving means into an engaged position upon insertion of the cartridge, guide means for guiding the driving means and locking means in to their locked disengaged positions upon withdrawal of the cartridge, light shield flange means extending about the top of the cartridge, and flange means to interact with the cavity walls and projections so as to secure the position of said cartridge upon insertion.

2. A method of inserting and withdrawing a font wheel into an apparatus for generating color text and graphics on photographic media, the apparatus including pivoting drive means and a pivoting locking means for selectively maintaining the drive means in the disengaged position, comprising, inserting a cartridge into a cavity in the apparatus, said cavity having guide projections which interact with flanges extending from said cartridge so as to securely position said cartridge, said cartridge having the font wheel rotatably mounted therein, selectively disengaging the locking bar with said cartridge upon insertion, said cartridge acting to disengage said locking bar by interacting with an actuation pin on said locking bar, guiding said drive means into driving engagement with the font wheel with said cartridge, said cartridge having a cam arranged to interact with an engagement pin extending from the driving means, and reengaging the locking bar with the driving means in the disengaged position upon withdrawing said cartridge.

* * * * *